(12) United States Patent
Rossetti et al.

(10) Patent No.: US 8,238,750 B2
(45) Date of Patent: Aug. 7, 2012

(54) SPLIT/SMART CHANNEL ALLOCATED WDM-PON ARCHITECTURE

(75) Inventors: Damiano Rossetti, Monza (IT); Carlo Tosetti, Sondrio (IT); Gianpaolo Barozzi, Cinisello Balsamo (IT)

(73) Assignee: Cisco Technology, Inc., San Jose, CA (US)

( * ) Notice: Subject to any disclaimer, the term of this patent is extended or adjusted under 35 U.S.C. 154(b) by 407 days.

(21) Appl. No.: 12/535,032

(22) Filed: Aug. 4, 2009

(65) Prior Publication Data

US 2011/0033187 A1 Feb. 10, 2011

(51) Int. Cl.
*H04J 14/00* (2006.01)
(52) U.S. Cl. ............................. 398/72; 398/67
(58) Field of Classification Search ............... 398/67, 398/72
See application file for complete search history.

(56) References Cited

U.S. PATENT DOCUMENTS

| | | |
|---|---|---|
| 2002/0071155 A1 | 6/2002 | Inada et al. |
| 2005/0047785 A1 | 3/2005 | Hwang et al. |
| 2006/0104638 A1* | 5/2006 | Chung et al. ................. 398/71 |
| 2007/0133990 A1 | 6/2007 | Kim et al. |
| 2007/0140693 A1 | 6/2007 | Li et al. |
| 2008/0050119 A1 | 2/2008 | Effenberger |
| 2008/0187314 A1* | 8/2008 | Chung et al. ................. 398/72 |
| 2008/0279230 A1 | 11/2008 | Dagenais |

FOREIGN PATENT DOCUMENTS

WO 2011017348 A1 2/2011

OTHER PUBLICATIONS

International Search Report and Written Opinion received for PCT Patent Application No. PCT/US2010/044282, mailed on Sep. 23, 2010, 10 pages.
Banerjee, A. et al., "Wavelength-Division-Multiplexed Passive Optical Network (WDM-PON) Technologies for Broadband Access: A Review [Invited]", Journal of Optical Networking, vol. 4, Issue 11, Nov. 2005, pp. 737-758.
Choudhary, M. et al., "Analysis of Next Generation PON Architecture for Optical Broadband Access Networks", Oct. 2006, 8 Pages.
Lee, Sang-Mook et al., "Consolidation of a Metro Network Into an Access Network Based on Long-Reach DWDM-PON", Optical Fiber Communication Conference and the National Fiber Optic Engineers Conference, Mar. 5-10, 2006, 6 Pages.

(Continued)

*Primary Examiner* — Nathan Curs

(57) ABSTRACT

Various example embodiments are disclosed. According to an example embodiment, a dual split passive optical network (PON) may be provided that includes an optical splitting device, and a first and second distribution fibers connected to the optical splitting device. A first cyclic AWG may be coupled to the optical splitting device via the first distribution fiber and a second cyclic AWG may be coupled to the optical splitting device via the second distribution fiber. In other example embodiments, an asymmetric power splitting ratio may be used for the splitting device, or optical seeds and/or optical data signals may be allocated to each of the cyclic AWGs based on a performance of the optical data signals and/or power loss/attenuation of the respective distribution fibers.

21 Claims, 4 Drawing Sheets

OTHER PUBLICATIONS

Arellano, C. et al., "RSOA-Based Optical Network Units for WDM-PON", Optical Fiber Communication Conference and the National Fiber Optic Engineers Conference. Mar. 5-10, 2006, 3 Pages.

Payoux, F. et al., "WDM-PON With Colorless ONUs", Conference on Optical Fiber Communication and the National Fiber Optic Engineers Conference, Mar. 25-29, 2007, 3 Pages.

Park, Hyung-Jin et al., "Recent Research Activities of WDM-PON in Korea", Conference on Optical Fiber Communication and the National Fiber Optic Optical Fiber Communication and the National Fiber Optic Engineers Conference, Mar. 25-29, 2007, 3 Pages.

Shin, D. J., et al., "Design and Performance of Low-Cost WDM-PON Access Networks", 33rd European Conference and Exhibition on Optical Communication, Sep. 16-20, 2007, 3 Pages.

Park, Soo-Jin et al., "WDM-PON System Based on the Laser Light Injected Reflective Semiconductor Optical Amplifier", 31st European Conference on Optical Communication, vol. 3, Sep. 25-29, 2005, pp. 457-458.

* cited by examiner

SPLIT/SMART CHANNEL ALLOCATED WDM-PON ARCHITECTURE

TECHNICAL FIELD

The present disclosure relates generally to optical networks.

BACKGROUND

There are a number of different technologies for providing high bandwidth data communication services to customer premises (e.g., businesses and residences). One such approach is Fiber to the Home technology, which uses optical fibers to carry optical signals in an optical data network from a central office to customer premises. Wavelength Division Multiplexing Passive Optical Network (WDM PON) architectures that are based on Reflective Semiconductor Optical Amplifiers (RSOAs) or externally seeded Fabry Perot (FP) laser interferometers may be used in Fiber to the Home technology. One advantage of such WDM PON architectures is that they allow for providing colorless Optical Line Terminals (OLT) at a central office and colorless Optical Network Units (ONUs) at customer premises.

Both RSOAs and FP laser interferometers require a seeding source. For instance, sliced Broadband Light Sources (BLSs) are used in some implementations. In other implementations, a Wavelength Division Multiplexer (WDM) continuous wave (CW) laser comb is used.

In some networks, modular components may be used, and the system may be scaled by adding components. In other types of networks, depending on the types of components used, an integrated solution may be used, or a shared architecture may be used that may require a network to be equipped with all the seeding channels. In some cases, one or more seeding channels may be wasted or unused, if the network is under-subscribed.

DESCRIPTION OF EXAMPLE EMBODIMENTS

Overview

Figure 1:
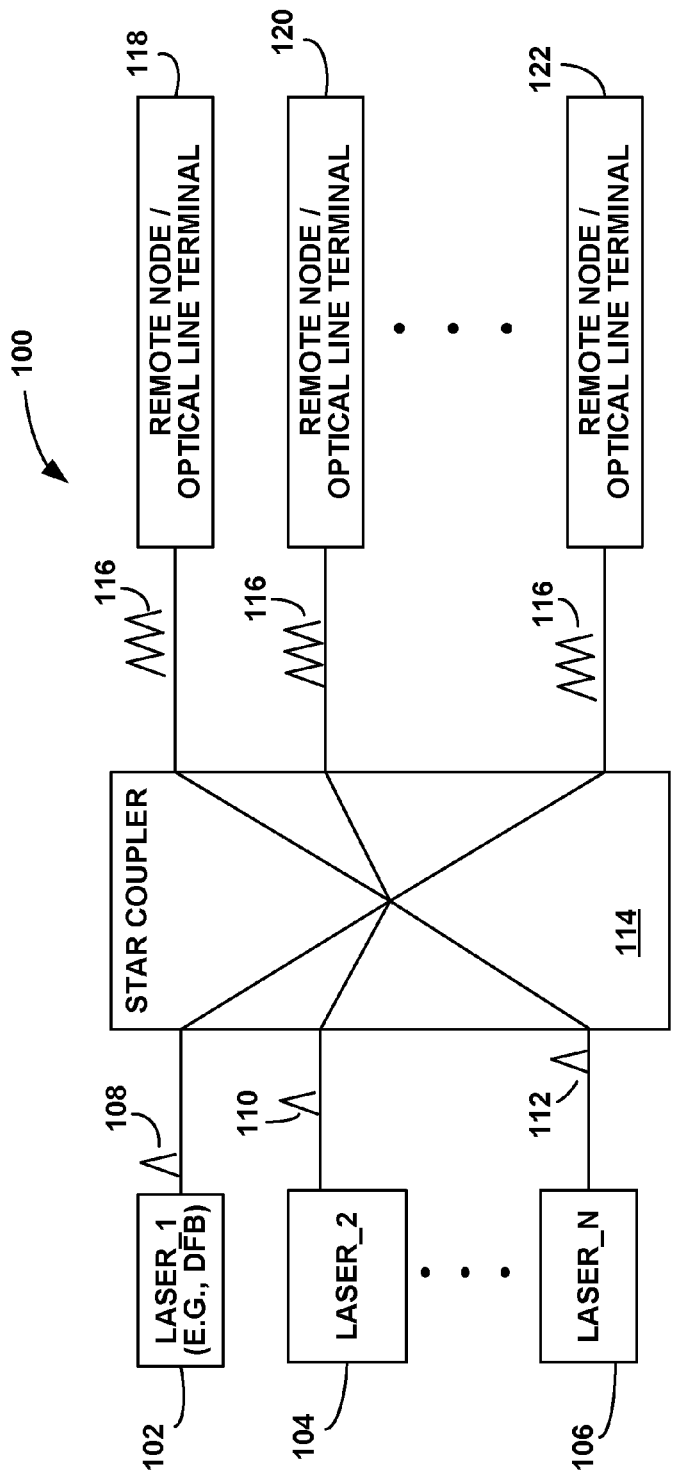
FIG. 1 is a block diagram illustrating an optical signal distribution network in accordance with an example embodiment.

According to an example embodiment, an apparatus may include an optical splitting device configured to receive multiplexed optical seeds and optical data signals, including a plurality of multiplexed individual optical seeds and a plurality of multiplexed individual optical data signals, via a feeder fiber, and to output the multiplexed optical seeds and data signals onto each of a first distribution fiber and a second distribution fiber. A first cyclic arrayed waveguide grating (AWG) may be provided at a first node and coupled to the first distribution fiber, the first cyclic AWG may be configured to demultiplex the multiplexed optical seeds and optical data signals and to distribute, for one or more of the plurality of individual optical seeds and data signals, one of the individual optical seeds and one of the individual optical data signals to a respective optical network unit (ONU) coupled to the first cyclic AWG. A second cyclic AWG provided at a second node and coupled to the second distribution fiber, the second cyclic AWG may be configured to demultiplex the multiplexed optical seeds and data signals and to distribute, for one or more of the plurality of individual optical seeds and data signals, one of the individual optical seeds and one of the individual optical data signals to a respective optical network unit (ONU) coupled to the second cyclic AWG. The first and the second cyclic AWGs are configured to allocate or distribute each of the plurality of individual optical seeds and data signals to a respective ONU that is coupled to either the first cyclic AWG or coupled to the second cyclic AWG. According to another example embodiment, an apparatus may include an optical splitting device configured to receive multiplexed optical data signals, including a plurality of multiplexed individual optical data signals, via a feeder fiber, and to output the multiplexed optical data signals onto each of a first distribution fiber and a second distribution fiber. One or more of the plurality of individual optical data signals are each allocated to either an optical network unit (ONU) coupled to the first distribution fiber or an ONU coupled to the second distribution fiber based on a performance of the individual optical data signal and a power loss of the first distribution fiber and a power loss of the second distribution fiber.

According to another example embodiment, an apparatus may include an optical splitting device configured to receive multiplexed optical seeds and optical data signals, including a plurality of multiplexed individual optical seeds and a plurality of multiplexed individual optical data signals, via a feeder fiber, and to output the multiplexed optical seeds and optical data signals onto each of a first distribution fiber and a second distribution fiber. A power loss of the first distribution fiber is greater than a power loss of the second distribution fiber. Also, the optical splitting device provides an asymmetrical power splitting ratio to provide more power to the optical seeds and optical data signals output onto the first distribution fiber and less power to the optical seeds and optical data signals output onto the second distribution fiber.

According to another example embodiment, a method may include receiving multiplexed optical data signals, including a plurality of multiplexed individual optical data signals, via a feeder fiber, and for outputting the multiplexed optical data signals onto each of a first distribution fiber and a second distribution fiber; allocating one or more of the plurality of individual optical data signals to either an optical network unit (ONU) coupled to the first distribution fiber or an ONU coupled to the second distribution fiber based on a performance of the individual optical data signal and a power loss of the first distribution fiber and a power loss of the second distribution fiber; and distributing each of the one or more of the individual optical data signals to a respective ONU based on the allocating.

According to another example embodiment, an apparatus may include means for receiving multiplexed optical data signals, including a plurality of multiplexed individual optical data signals, via a feeder fiber, and for outputting the multiplexed optical data signals onto each of a first distribution fiber and a second distribution fiber; means for allocating one or more of the plurality of individual optical data signals to either an optical network unit (ONU) coupled to the first distribution fiber or an ONU coupled to the second distribution fiber based on a performance of the individual optical data signal and a power loss of the first distribution fiber and a power loss of the second distribution fiber; and means for distributing each of the one or more of the individual optical data signals to a respective ONU based on the allocating.

Example Embodiments

FIG. 1 is a block diagram illustrating an optical signal distribution network 100 in accordance with an example embodiment. The network 100 may be implemented as part of a Fiber to the Home optical data network to distribute optical seed signals for either upstream or downstream data traffic.

The network 100 includes a multi-output laser array that includes N lasers, designated Laser_1 102, Laser_2 104 and Laser_N 108. N could be a number of values. For instance, N may be a value that is a power of two (2), such as 4, 8, 16 or 32. Other values for N are, of course, possible. In the network 100, the N lasers 102-106 may be distributed feedback (DFB) lasers. Such DFB lasers may provide high quality optical seed signals, such as the optical seed signals described herein.

For instance, each of the N lasers 102-106 may produce a respective optical seed signal. As shown in FIG. 1, the Laser_1 102 may produce optical seed (or seed signal) 108, where the seed signal 108 has a first wavelength. In like fashion, the Laser_2 104 may produce an optical seed (or seed signal) 110 having a second wavelength, and the Laser_N 106 may produce an optical seed (or optical seed signal) 112 having a third wavelength. As shown in FIG. 1, the optical signals 108, 110 and 112 may have respective wavelengths that, in the frequency domain, offset so as not to result in any substantial interference between the optical seeds (or seed signals) when they are transmitted together on a single optical fiber (e.g., when the signals are multiplexed with each other). In an example embodiment, where N is equal to thirty-two, thirty-two DFB lasers may be used to generate thirty-two optical seed signals of thirty-two wavelengths that do not substantially interference with each other when they are multiplexed with each other and transmitted together on a single optical fiber.

The network 100 also includes an optical star coupler 114. The star coupler 114 has N optical input terminals and N optical output terminals. Depending on the particular embodiment, the star coupler 114 may be a monolithically integrated star coupler. In other embodiments, the star coupler 114 may be implemented using discrete components, such as a plurality of cross-coupled passive couplers.

As shown in FIG. 1, the individual optical seeds or seed signals 108, 110 and 112 may be provided to respective optical input terminals of the star coupler 114. In the network 100, the star coupler 114 is configured to multiplex the individual optical seeds (or seed signals) 108-112 with each other to produce multiplexed optical seeds or a multiplexed seed signal 116.

As shown in FIG. 1, the multiplexed optical seed signal 116 may be provided at each output terminal of the star coupler 114. For instance, in an embodiment where N is equal to thirty-two, the star coupler 114 would have thirty-two optical input terminals for receiving thirty-two individual optical seed signals (e.g., from thirty-two DFB lasers). In this example, the star coupler 114 would also have thirty-two optical output terminals. In such an implementation, the star coupler 114 may multiplex the respective thirty-two individual optical seed signals into a multiplexed optical seed signal 116 that includes all thirty-two individual optical seed signals. The star coupler 114 may then communicate the multiplexed optical seed signal 116 to each of its thirty-two optical output terminals.

Each optical output port of the star coupler 114 may then communicate the multiplexed optical seed signal 116 to a corresponding optical network device (e.g., distribution nodes/OLTs 118, 120 and 122) using a single optical fiber per optical output terminal of the star coupler 114. In this example, the multiplexed optical seed signal 116 may be provided to thirty-two optical network devices (e.g., distribution nodes/OLTs 118, 120 and 122), one optical network device per optical output port of the star coupler 114.

The multiplexed optical seed signal 116 may then be de-multiplexed by a cyclic arrayed waveguide grating (AWG) in order to provide the thirty two individual optical seed signals to thirty-two optical data network endpoints (e.g., bi-directional optical data communication devices included in an optical line terminal (OLT) or bi-directional optical network units (ONUs) located at customer premises) per optical fiber.

Thus, in an example embodiment, 32 individual optical seed signals from 32 lasers are each multiplexed onto 32 optical fibers, where each fiber carries the 32 individual optical seed signals in multiplexed form. The 32 fibers may then each be used to provide the multiplexed optical seeds/seed signal to respective passive optical networks (PONs) or distribution nodes (e.g., distribution nodes 118, 120 or 122), for a total of 32 PONs. In this example, each of the 32 PONs may then de-multiplex the multiplexed optical seed signal and provide the 32 individual optical seed signals (or seeds) to 32 customer premises per PON for use in optical data communication. The individual optical seed signals may then be modulated and amplified by seeded optical transmitters included in the ONUs to generate respective optical data signals that are used for upstream data communication in, for example, a Fiber to the Home optical data network.

In this example, 32 individual optical seed signals are provided to 32 PONs via 32 respective single optical fibers. The 32 individual optical seed signals are de-multiplexed by, for example, respective WDM AWGs included in each of the 32 PONs. The 32 individual optical seed signals are then provided to 32 respective ONUs located at respective customer premises per PON. Accordingly, in this example, 32 lasers may be used to provide optical seed signals for 1,024 ONUs located at customer premises (i.e., 32×32 or N×N). While 32 is used in this example, N may be any number.

In like fashion as discussed above with regard to using the network 100 to provide optical seed signals to ONUs located at customer premises (e.g., for use in generating upstream optical data signals), the network 100 may be used to provide optical seed signals to bi-directional optical data communication devices included in an OLT located at, for example, a central office of a Fiber to the Home service provider. The optical seeds or seed signals provided to the OLTs may be used by corresponding bi-directional optical data communication devices to generate optical data signals for downstream data communication in, for example, Fiber to the Home optical data networks or other optical data network configurations. For example, an optical seed or optical seed signal may be an (unmodulated) optical carrier wave signal, while an optical data signal may be generated after the seed (or seed signal) has been amplified and modulated, for example.

For instance, in such an embodiment, each optical output port of the star coupler 114 may communicate the multiplexed optical seed signal 116 to a corresponding OLTs (e.g., OLT 118, 120 or 122) using a single optical fiber per optical output terminal of the star coupler 114. In this example, the multiplexed optical seed signal 116 may be provided to thirty-two optical OLTs. The multiplexed optical seed signal 116 (provided to a given OLT) may then be de-multiplexed by a cyclic AWG included in the given OLT in order to provide the thirty two individual optical seed signals to thirty-two bi-directional optical data communication devices included in or coupled with the given OLT (e.g., at a central office).

Accordingly, in this example, 32 optical seed signals are provided to 32 OLTs via 32 respective single optical fibers. The 32 individual optical seed signals are de-multiplexed by, for example, a WDM AWG included in each of the 32 OLTs. The 32 individual optical seed signals are then provided to 32 respective bi-directional optical data communication devices per OLT. Accordingly, in this example, 32 lasers may be used to provide optical seed signals for 1,024 bi-directional optical data communication devices located at a central office (e.g., 32×32 or N×N).

In similar fashion as discussed above with respect to providing optical seed signals to PONs, such an approach represents a substantial cost savings over implementations using CW gratings, which require N lasers to serve N bi-directional optical data communication devices, or one laser per device. Such an approach also uses laser power more efficiently because the N lasers are shared across N OLTs.

Figure 2:
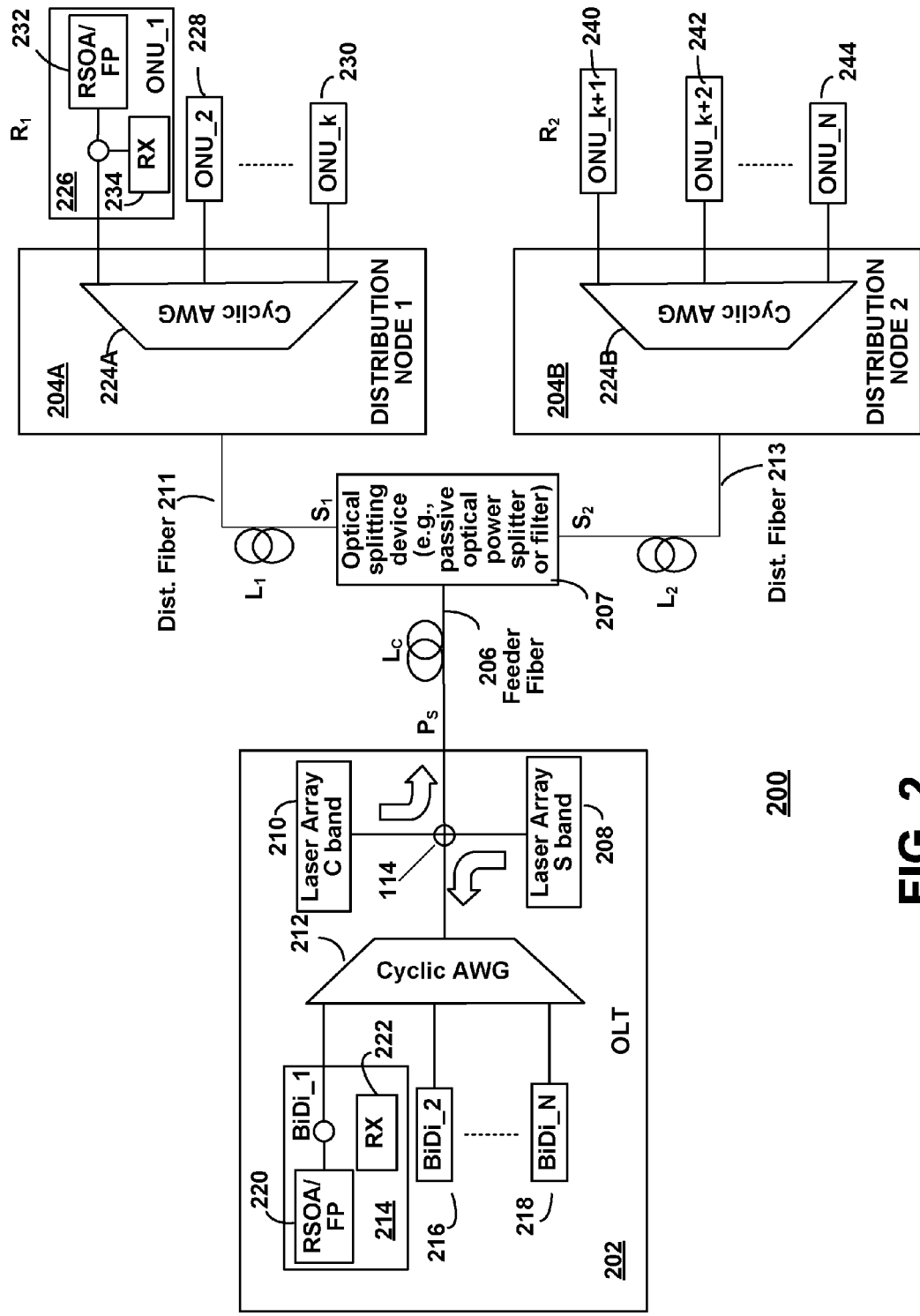
FIG. 2 is a block diagram illustrating an optical network 200 in accordance with an example embodiment.

FIG. 2 is a block diagram illustrating an optical network 200 in accordance with an example embodiment. In an example embodiment, network 200 may be a dual split and/or smart channel allocated WDM-PON architecture. In this network 200, an optical splitting device 207 (which may be an optical splitter/coupler) may provide a multiplexed optical seed signal (e.g., including N individual optical seeds or seed signals) to each of two (or dual) distribution (or remote) nodes 204A, 204B, with each distribution node including a cyclic AWG 224A, 224B. Cyclic AWGs 224A, 224B may each be coupled to the splitting device 207 via a respective distribution fiber (distribution fibers 211, 213). A plurality of optical network units (ONUs) are connected to each AWG.

With respect to signals in the downstream direction (from OLT to ONU), optical splitting device 207, may receive multiplexed optical seeds (or seed signals) and multiplexed optical data signals (from OLT 202 via feeder fiber 206). These seeds and data signals include a plurality of multiplexed individual optical seeds and a plurality of multiplexed individual optical data signals. The optical splitting device may output (or split) the received multiplexed optical seeds (or seed signals) and multiplexed optical data signals onto each of a first distribution fiber 211 and a second distribution fiber 213. This may result, for example, in duplicate copies of the received signals being output onto distribution fibers 211 and 213, but the power of the signals on distribution fibers 211 and 213 being less than (e.g., one half of) the power of the signals received at the splitting device 207 due to operation of the splitting device 207. For example, in the downstream direction, the splitting device 207 may receive and output one or more multiplexed individual C band seeds or seed signals (e.g., to be modulated by respective ONUs) and one or more multiplexed individual S band data signals (that were modulated by the OLT 202).

Alternatively, optical splitting device 207 may selectively pass the received signals (or may filter some signals), e.g., such that only those optical seeds and optical data signals allocated to ONUs or cyclic AWGs coupled to distribution fiber 211 are passed or output by splitting device 207 onto distribution fiber 211, and only those seeds and data signals allocated or assigned to ONUs or cyclic AWGs coupled to distribution fiber 213 are passed or output by splitting device 207 onto distribution fiber 213.

In the upstream direction (e.g., from ONU/AWG to OLT), the optical splitting device 207 may operate as an optical coupler (e.g., optical splitter/coupler), by coupling the signals received via distribution fibers 211 and 213 onto feeder fiber 206. For example, optical splitting device 207 may receive and couple, e.g., the C band optical data signals received via both distribution fibers 211 and 213, and output the combined (or coupled) optical data signals (received via both distribution fibers 211 and 213) onto the feeder fiber 206.

In one example, the distribution fibers may be of unequal length, and therefore, may cause a different power loss (or different signal attenuation). The receivers at each ONU may have a required (or minimum) power for a received signal, to allow the receiver to operate properly (e.g., to allow the ONU receiver to properly discriminate between 0s and 1s). Providing a same signal power of a signal transmitted from an OLT 202 across two branches or paths having different power losses (or different signal attenuations), may result in the signal that traverses the longer (or higher power loss) path not meeting the required or minimum power when received at an ONU, for example.

In an example embodiment, several different techniques may be used to compensate for different power losses (or different path lengths) of the two paths (or branches) for this dual split PON architecture. First, an optical splitting device may be used that has an asymmetric power splitting ratio that provides a higher power (or lower power loss/signal attenuation) for the longer (or higher loss) distribution fiber. Second, within a group of N individual optical data signals provided within a given bandwidth, a first group (or first subset) of the individual optical data signals may have a higher performance (e.g., may provide a same bit error rate or BER for a lower signal power) than a second group (or second subset) of the individual optical data signals. Thus, in an example embodiment, the individual optical data signals having a higher performance may be allocated to the path or distribution node having a higher power loss (or higher optical signal attenuation).

In an example embodiment, the individual optical data signals may be allocated to (or assigned to) an ONU (optical network unit) that is coupled to either distribution fiber 211 or 213, e.g., based on the performance of the optical data signal and/or the power loss (or signal attenuation) of the distribution fiber (211 or 213) coupled to the respective ONU. For example, higher performing optical data signals may be allocated to ONUs coupled to a longer optical path (or coupled to a distribution fiber having a higher power loss or signal attenuation). In addition, an optical seed (or optical seed signal), e.g., having a corresponding channel as the optical data signal, may be allocated or assigned to the ONU, although the optical seed and optical data signal may be in different frequency bands, e.g., C band and S band, as examples.

Thus, for example, channel 1 optical data signal in the S band and channel 1 optical seed in the C band may be assigned to one ONU (e.g., based on the performance of channel 1 optical data signal and power loss of fibers 211, 213). Thus, corresponding channels (signals) of the seeds and optical data signals may be assigned or allocated together to an ONU, according to an example embodiment (although the corresponding signals to be allocated together may typically be in different frequency bands). The optical seeds or data signals allocated or assigned to an ONU may be received by the associated cyclic AWG, and then the cyclic AWG may forward the allocated/assigned signal(s) to the ONU (e.g., and the non-allocated signals are not forwarded by the AWG to that particular ONU, but may be assigned or allocated to another ONU). Various example embodiments are described in more detail herein.

The network 200 illustrates an optical data network that includes a single OLT 220 and a dual split PON, that includes two distribution nodes 204A, 204B and a plurality of ONUs connected to each distribution node. A first PON (or a first portion of the dual split PON) may include distribution node 204A and a plurality of ONUs including ONU_1 232, ONU_2 228, . . . ONU_k 230. Similarly, a second PON (or a second portion of the dual split PON) may include a distribution node 2 204B and a plurality of ONUs including ONU_k+1 240, ONU_k+2 242, . . . ONU_N 244. Each distribution node may be provided at a particular location, e.g., a building, area, for a neighborhood, or the like, and each ONU may be located at a respective customer premises (e.g., home, apartment) or other customer location, according to an example embodiment. As also shown in FIG. 2, an OLT 202 includes a plurality of N bi-directional optical data communication devices BiDi_1 214, BiDi_2 216 and BiDi_N 218.

In the network 200, optical seeds and data signals may be provided to the OLT 202 and the distribution nodes 204A, 204B in the fashions discussed above with respect to FIG. 1. In such implementations, the OLT 202 and the distribution nodes 204A/204B (as a pair) may be one of N instances of each, for example. Further, in the network 200, respective multiplexed optical seeds and data signals may be provided to the OLT 202 over an optical feeder fiber (or common fiber) 206.

According to an example embodiment, a multiplexed optical seed signal(s) and a multiplexed optical data signal(s), may be transmitted from OLT 202 over feeder fiber 206 to an optical splitting device 207. Optical splitting device 207 may be, for example, an optical power splitter/coupler, an optical filter or other device. For example, the optical splitting device 207 may be a skip-N filter in which one or more seed signals or channels may be skipped or omitted. The optical splitting device 207 may receive the multiplexed optical seeds (or seed signals) and multiplexed optical data signals via feeder fiber 206, may split the multiplexed optical seeds and optical data signals and output the multiplexed optical seeds and data signals onto both a first distribution fiber 211 and onto a second distribution fiber 213. Distribution node 1 204A is coupled to the optical splitting device 207 via the first distribution fiber 211, and distribution node 2 204B is coupled to the optical splitting device 207 via the second distribution fiber 213. The multiplexed optical seed signal may include respective individual optical seed signals for use by the various ONUs connected to distribution node 1 204A and the ONUs connected to distribution node 2 204B, to allow these ONUs to generate respective upstream optical data signals. Each of the plurality of individual optical seed signals may be distributed to a respective ONU that is connected to either distribution node 1 204A or distribution node 2 204B. The multiplexed optical data signal may include a plurality of individual optical data signals, where each individual optical data signal may be allocated to and received by a respective ONU, e.g., one optical data signal to be allocated to and transmitted to each ONU, for example.

As shown in FIG. 2, the multiplexed optical seed signal (or multiplexed optical seeds) provided to each of the distribution nodes 204A, 204B may be generated using a C-band laser array 210 that includes N lasers to generate N individual optical seed signals. The multiplexed optical data signals may be generated by OLT 202. The multiplexed optical seed signal and multiplexed optical data (e.g., modulated and amplified) signal may be generated using the techniques described herein, as an example. The multiplexed optical seed signal and multiplexed optical data signal may then be provided to N (PONs) of the network 200 using respective optical fibers, including the PON that includes both of distribution nodes 204A and 204B (which may be considered a split PON architecture).

As shown in FIG. 2, the distribution node 1 204A includes a symmetric cyclic AWG 224A that is used to de-multiplex N individual optical seed signals from a multiplexed optical seed signal generated by the laser array 210 and an associated star coupler, such as the star coupler 114 of FIG. 1, for example. The cyclic AWG 224A may also de-multiplex the N multiplexed individual optical data signals, e.g., transmitted by OLT 202. The distribution node 204A is coupled to the ONUs 226, 228, . . . and 230. Similarly, the distribution node 2 204B includes a symmetric cyclic AWG 224B that is used to de-multiplex N individual optical seed signals from a multiplexed optical seed signal generated by the laser array 210 and an associated star coupler, such as the star coupler 114 of FIG. 1, for example. AWG 224B may also de-multiplex the N multiplexed individual optical data signals, e.g., transmitted by OLT 202. The distribution node 204B is coupled with the ONUs 240, 242, . . . and 244.

In an example embodiment, a first subset of the N individual optical seed signals and a first subset of the N individual optical data signals may be allocated to the distribution node 1 204A and may be distributed by cyclic AWG 224A, and each of the N individual seed signals and each of the individual optical data signals (of the first subset) may be allocated to and output to respective ONUs 226, 228, . . . 230. Similarly, a second subset of the N individual optical seed signals and a second subset of the N individual optical data signals may be allocated to the distribution node 2 204B and may be distributed by cyclic AWG 224B to respective ONUs 240, 242, . . . 244.

As illustrated by the ONU_1 226 in FIG. 2, each ONU 226-230, and 240-244 may include a seeded optical transmitter 232 and an optical receiver 234. The optical receiver 234 may be configured to receive downstream optical data signals from an OLT (e.g., the OLT 202) located in a central office.

In the network 200, the seeded optical transmitter 232 may be implemented as a polarization independent reflective semiconductor optical amplifier (RSOA) or a polarization independent Fabry Perot (FP) laser interferometer, as examples. The seeded optical transmitter 234 of each ONU 226-230 and 240-244 may be configured to receive a respective individual optical seed signal, and modulate and amplify the received respective optical seed signal to generate a respective (upstream) optical data signal. Use of polarization independent seeded optical transmitters and symmetric cyclic AWGs allow for providing colorless OLTs and ONUs in optical networks such as those described herein.

Optical feeder fiber 206 may also include a second optical fiber for providing a multiplexed optical seed signal and optical data signal to the OLT 202 for use in bi-directional optical data communication devices BiDi_1 214, BiDi_2 216 and BiDi_N 218 included in the OLT 202. Distribution fibers 211 and 213 may also each include a second optical fiber for upstream transmission. The BiDis 214-218 may use individual optical seed signals included in the multiplexed seed signal to generate respective downstream optical data (modulated and amplified) signals. As shown in FIG. 2, the multiplexed optical seed signal provided to the OLT 202 may be generated using an S-band laser array 208 that includes N lasers to generate N individual optical seed signals. The multiplexed optical seed signal may be generated using the techniques described herein. The multiplexed optical seed signal may then be provided to N OLTs of the network 200, including the OLT 202, using respective optical fibers.

As shown in FIG. 2, the OLT 202 includes a symmetric cyclic AWG 212 that is used to de-multiplex N individual optical seed signals from a multiplexed optical seed signal generated by the laser array 208 and an associated star coupler, such as the star coupler 114 of FIG. 1, for example. Cyclic AWG 212 may also de-multiplex N individual optical data signals from a multiplexed optical data signal (e.g., C band data signals) received from optical splitting device 207 via feeder fiber 206. The OLT 202 also includes the bi-directional optical data communication units (BiDis) 214-218. As illustrated by the BiDi_1 214 in FIG. 2, each BiDi 214-218 may include a seeded optical transmitter 220 and an optical receiver 222. The optical receiver 222 may be configured to receive upstream optical data signals from a PON, such as the dual split PON illustrated in FIG. 2.

In the network 200, the seeded optical transmitter 220 may be implemented as a polarization independent RSOA or a polarization independent FP laser interferometer. The seeded optical transmitter 220 of each BiDi 214-218 may be configured to receive a respective individual optical seed signal, and modulate and amplify the received respective optical seed signal to generate a respective (downstream) optical data signal (e.g., S band data signal). Use of polarization independent seeded optical transmitters and symmetrical cyclic AWGs allow for providing colorless OLTs and ONUs in optical networks such as those described herein.

By using a dual (or multiple) split PON or multiple distribution nodes connected to a splitting device, the individual optical seeds and data signals or optical channels may be flexibly allocated to either distribution node 1 204A or distribution node 2 204B based on subscriber demand or other factors or criteria, and the individual optical seeds and data signals may be reallocated between the two distribution nodes as subscriber demand may change. For example, a first individual optical seed signal and first optical data signal may be allocated to distribution node 1 204A (and may be distributed to a first ONU connected to distribution node 1 204A). When the customer or subscriber associated with the first ONU terminates the WDM-PON data service, this first individual optical seed signal and first optical data signal may be re-allocated to the distribution node 2 204B (and, e.g., may be distributed to a second ONU connected to distribution node 2 204B). Thus, in an example of the dual split WDM-PON architecture, an optical splitting device may be used to, for example, merge otherwise sub-populated PONs (at least in one example) into a single optimized (or more fully utilized) split-PON that may more fully use the seed source and AWG provided at a central office or OLT, as shown in FIG. 2. Also, individual downstream optical seeds and data signals may be allocated to cyclic AWG 224A or 224B based on, for example, the performance of each individual optical seed or optical data signal, and the length or loss of the distribution fibers 211 and 213 (or the overall or total optical power loss across the respective optical paths from OLT 202 to AWG 224A and AWG 224B). In an example embodiment, the performance may be measured as bit error rate, and therefore, the optical data signal (with a modulated signal on the optical seed) may provide a performance measurement for an optical signal.

The optical splitting device 207 may cause an insertion power loss (or optical signal attenuation). This power loss may, in some situations, decrease the power of the signal received by an ONU to be less than the receiver sensitivity of the ONU, or, alternatively, may impact (e.g., decrease) the maximum distance that a distribution node/ONU may be located from the CO/OLT (e.g., since beyond such maximum distance, the signal power received at the ONU may be insufficient or less than the receiver sensitivity). The receiver sensitivity may be considered to be the minimum signal power of a signal received at an ONU that provides an acceptable or given bit error rate (BER), for example. If a data signal is received that has a power less than this required power level (or less than the receiver sensitivity), then the receiver may not be able to correctly discriminate between 1s and 0s of the received optical data signal, and may thus generate errors.

According to an example embodiment, the optical splitting device 207 may be added in the network, e.g., in order to merge different (and possibly otherwise sub-populated or under-utilized) PONs into a single, and more fully utilized, dual split PON. The optical splitting device 207 may be placed in different positions within the layout of the network 200, and may, in some cases, be placed anywhere along the feeder fiber 206. In one case, the optical splitting device 207 may be located at or very near the CO/OLT 202. This may result in two relatively long distribution fibers, and a feeder fiber of length=0 (or a relatively short feeder fiber). In another case, the splitting device 207 may be located at or very near the distribution nodes, e.g., where lengths of the distribution fibers may be zero or relatively short, for example. In a third example case, the splitting device may be provided somewhere along the feeder fiber, where the lengths of the feeder fiber, and both distribution fibers are greater than zero.

According to an example embodiment, a constraint on the network (or system design) may be the power budget. In general, $$Ps-\text{total losses} \geq R; \qquad (\text{Eqn. 1})$$

where,

Ps—the power of the optical data signal at the source

Total losses—all power losses due to fiber, optical splitting, etc.

R—receiver sensitivity, or minimum required power of a signal received at the ONU. Thus, Eqn. 1 indicates that the seed signal power minus the total power losses should be greater than or equal to the receiver sensitivity.

The optical power losses in the dual split PON network of FIG. 2 may include: $L_C$ which is the loss (or signal attenuation) due to the feeder fiber 206; $L_1$, which is the loss at the optical splitting device 207 in the direction towards distribution node 1 204A (towards cyclic AWG 224A); $L_2$, which is the loss at the optical splitting device 207 in the direction towards distribution node 2 204B (towards cyclic AWG 224B). Also, as shown in FIG. 2, Ps is the power of the optical data signal output from the OLT 202/CO. $R_1$ is the receiver sensitivity (or minimum required signal power) for receivers at ONUs that are connected to the cyclic AWG 224A (of distribution node 1 204A); $R_2$ is the receiver sensitivity (or minimum required signal power) for receivers at ONUs that are connected to the cyclic AWG 224B (of distribution node 2 204B).

Thus, the power budget with respect to the distribution node 1 (or with respect to cyclic AWG 224A) may be described using the following (see FIG. 2): $P_s-(L_C+L_1+S_1) \geq R_1$, where $(L_C+L_1+S_1)$ are the total losses of the first path (including feeder fiber 206, splitting device 207 and distribution fiber 211) that leads to distribution node 1/cyclic AWG 224A. And, similarly, the power budget with respect to the distribution node 2 (cyclic AWG 224B) may be described based on: $P_s-(L_C+L_2+S_2) \geq R_2$, where $(L_C+L_2+S_2)$ are the total losses of a second path (including feeder fiber 206, splitting device 207 and distribution fiber 213) that leads to distribution node 2/cyclic AWG 224B. Different lengths for distribution fibers 211 and 213 may result in different total losses for a first path and a second path, respectively.

In an example embodiment, different techniques may be used to compensate for (or accommodate) different power losses (or different path lengths) of the two paths for this dual split PON architecture, and also accommodate for (or assist in offsetting) the insertion loss of the optical splitting device 207. First, an optical splitting device 207 may be used that has an asymmetric power splitting ratio that provides higher power (or lower loss/signal attenuation) for signals transmitted on the longer (or higher loss) distribution fiber. For example, more power (or less attenuation) may be applied to the signal output to the distribution fiber that is the longest of the two distribution fibers 211, 213. Thus, higher signal power may be provided for the higher loss distribution fiber, e.g., to allow the power budget for both paths to be satisfied. Alternatively, a symmetric splitting ratio may, for example, provide 50% of the available power on each of the distribution fibers 211, 213. This may result in a 3 dB loss (associated with a loss of half the input power) at the splitting device 207 in each direction. An asymmetric splitting ratio may allocate more power to the signal output to one of the distribution fibers, and less power to the other distribution fiber (different losses in each direction output from the splitting device).

As a second technique to accommodate different length distribution fibers or offset the insertion loss of the optical splitting device 207, individual optical seed signals and individual data signals may be allocated to different cyclic AWGs based on the performance of the individual optical data signals and based on the total path losses (which may include fiber loss due to feeder fiber, insertion loss of device 207 in a direction towards the distribution fiber or AWG, plus power loss of a distribution fiber) associated with each cyclic AWG (or based on the loss of distribution fibers 211, 213). For example, higher performing optical data signals (e.g., and corresponding optical seed signals or seed signals having a same channel number as the optical data signal, but in a different frequency band) may be assigned to the higher loss path (or to the longer distribution fiber). For example, within a group of N individual optical data signals provided within a given bandwidth, a first group (or first subset) of the individual optical data signals may have a higher performance (e.g., may provide a same bit error rate or BER using a lower signal power) than a second group (or second subset) of the individual optical data signals. Thus, in an example embodiment, the individual optical data signals having a higher performance may be allocated to the path or distribution node having a higher power loss. Also, the optical seed signals (or seeds) or optical seed channels, corresponding to the higher performing optical data signals, may also be allocated to the longer path or longer distribution fiber. For example, channels 1-4 of the optical data signals in a first frequency band and channels 1-4 of the optical seeds may be allocated to the longer or higher loss path or distribution fiber. The allocation of optical data signals and optical seeds to one of the two cyclic AWGs at distribution nodes based on performance of the optical data signals and/or based on losses of the two different paths (including losses of the two respective distribution fibers) may be referred to as smart channel allocation or SCA, according to an example embodiment, since channels may be allocated in a smart way so as to match better performing optical channels (e.g., optical data signals and/or optical seeds) to higher loss optical paths/fibers, for example.

Figure 3:
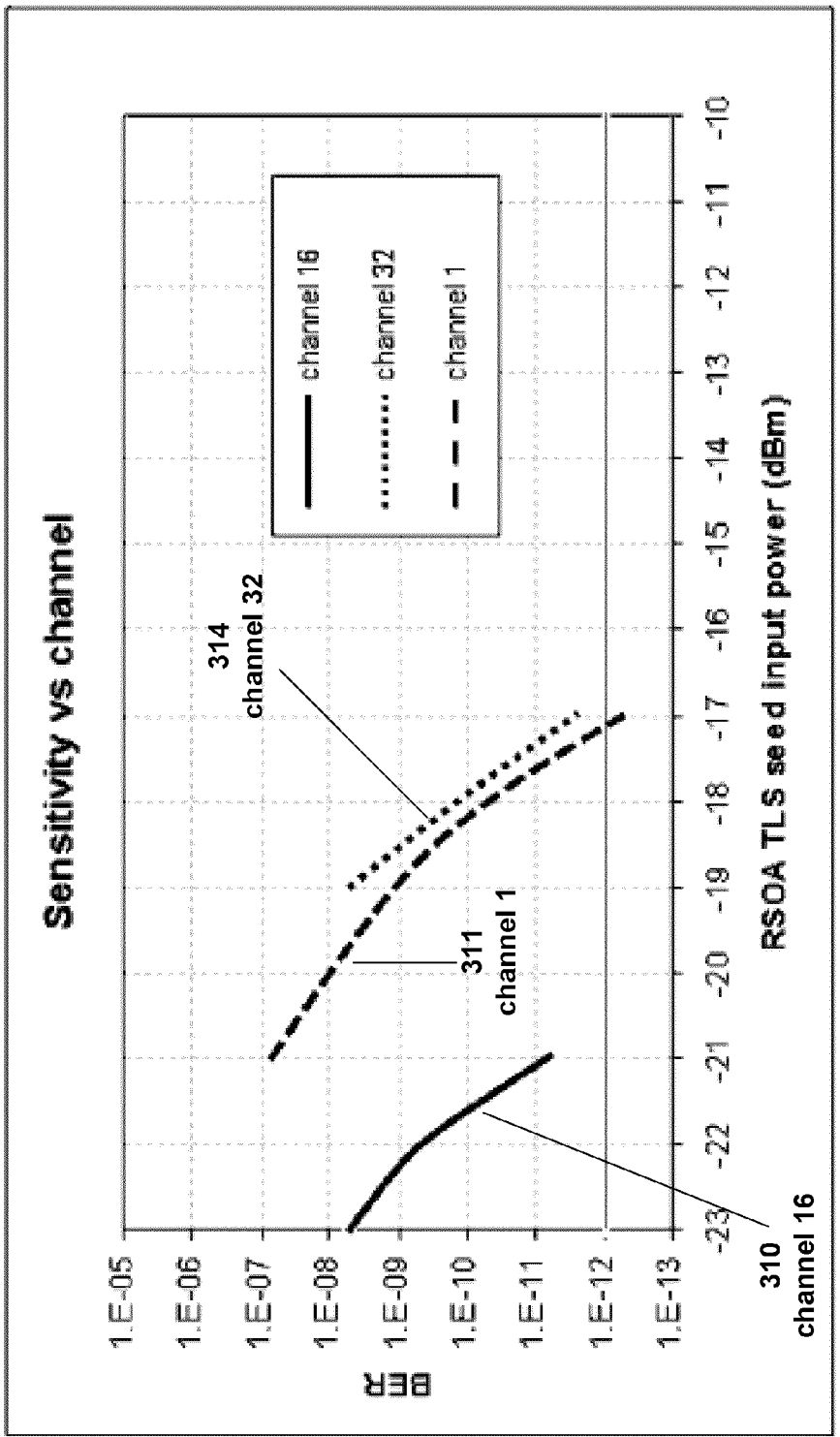
FIG. 3 is a diagram illustrating how different optical signals may have a different performance according to an example embodiment.

FIG. 3 is a diagram illustrating how different optical signals may have a different performance according to an example embodiment. In this example embodiment, one or more channels or optical seed signals located near the middle or center of a PON optical bandwidth (e.g., such as channel 16, where N=32 in this example) may have a performance that is better or higher/greater than the performance of one or more channels (e.g., channels 1 and 32) located near the edge of the bandwidth. As shown in the example of FIG. 3, channels 1 and 32 provide a bit error rate (BER) of 10-12 using a signal power of −17 dBm, whereas channel 16 provides the same BER of $10^{-12}$ using a signal power of −21 dBm (which is a lower power). Thus, 4 dB of improvement, in this example shown in FIG. 3, may be achieved by using channel 16 over either channels 1 and 32 in this example. Therefore, smart channel allocation may involve allocating channel 16 (or other higher performing channel/optical data signal) to a distribution node or cyclic AWG that is coupled to a longer distribution fiber (having a higher power loss) or located farther from the CO/OLT 202, since channel 16 may provide (at least in this example) the same BER at the ONU using a lower power signal (e.g., better performance). Thus, for example, higher performing (or better performing) individual optical data signals or optical channels may be used for a longer (or higher loss) fiber, since a lower power signal received via channel 16 (or other optical signal near the center of the bandwidth) at the receiver/ONU may achieve the same BER, as compared to other lower performing optical data signals (e.g., channels 1 and 32 in this example located near the edge of the bandwidth) that obtain the same BER using a higher power signal. This is merely an example. In other example embodiments, higher performing channels or higher performing optical seed signals or optical data signals may be provided at other locations (e.g., other than the center or middle of a bandwidth) within an optical bandwidth, for example. Also, the channels/optical data signals or seeds that perform better or worse may depend on the type of optical equipment being used, e.g., the type of lasers and other devices, for example. The examples herein are provided only as examples or for illustration purposes, and the disclosure is not limited thereto.

Table 1 below illustrates some examples of power budgets achieved using different combinations of smart channel allocation and symmetric or asymmetric power splitting ratios for the optical splitting device according to various example embodiments.

TABLE 1

| Row | $S_1$ | $S_2$ | $R_1$ | $R_2$ | $L_C + L_1$ | $L_C + L_2$ | comment |
|---|---|---|---|---|---|---|---|
| 1 | 3dB | 3dB | =R | =R | 2dB (8 km) | 2dB (8 km) | Sym |
| 2 | 3dB | 3dB | =R | =R-3dB | 2dB (8 km) | 5dB (20 km) | Sym + SCA |
| 3 | 1.5dB | 5dB | =R | =R-3dB | 3.5dB (14 km) | 3dB (12 km) | Asym. + SCA |
| 4 | 1.7dB | 1.7dB | =R | =R | 3.3dB (13 km) | 3.3dB (13 km) | Sym + FIL |
| 5 | 1.7dB | 1.7dB | =R | =R-3dB | 3.3dB | 6.3dB (25 km) | Sym + SCA + FIL |

Sym: symmetrical power splitting ratio (of device 207)
Asym.: Asymmetrical power splitting ratio (of device 207)
SCA: Smart channel allocation
FIL: skip-N filter at device 207, e.g., instead of optical power splitter Referring to Table 1, in the example of rows 1-5, it is assumed that a maximum total path loss is 5 dB. In row 1, symmetrical power splitting is used by device 207, with a 3 dB loss for each of $S_1$ and $S_2$. The fiber loss ($L_C + L_1$ for a first path, or $L_C + L_2$ for a second path) for each path is 2 dB, which means a total path loss of 5 dB for each of the two paths (path for distribution node 1 204A, and the path for distribution node 2 204B). This works, since the receiver sensitivity $R_1$ and $R_2$ are the same (equal to R).

In row 2, symmetric power splitting is used, with a 3 dB loss for each of $S_1$ and $S_2$. However, in the example of row 2, distribution node 2 224B is located 12 km beyond distribution node 1 224A. Thus, the total fiber loss ($L_C+L_2$) for the second path is 5 dB (due to fiber path length of 20 km), while the total fiber loss ($L_C+L_1$) for the first path is 2 dB (due to fiber path length of 8 km). This results in the optical signal received at cyclic AWG 224B that is 3 dB lower than the optical signal that is received at the cyclic AWG 224A. However, smart channel allocation is used in this example of row 2 to allocate a higher performing optical seed signal (e.g., channel 16 or other higher performing channel/signal) to distribution node 2/cyclic AWG 224B, e.g., so that a same (acceptable) BER may be obtained by the ONU associated with AWG 224B even though the received signal is 3 dB lower.

In the example of row 3 of Table 1, asymmetric splitting ratio is used where the insertion loss $S_1$ (insertion loss of device 207 in the direction of distribution fiber 211) is 1.5 dB, while the insertion loss $S_2$ (in the direction of distribution fiber 213) is 5 dB. The fiber path losses are slightly different (3.5 dB vs. 3 dB). Thus, the total path loss for the first path (path leading to distribution node 1 204A) is 5 dB, while the total loss of the second path (path leading to distribution node 2 204B) is 8 dB. Smart channel allocation is used in this example to allocate a higher or better performing optical seed signal(s) to the cyclic AWG 224B, which will experience the greater loss or signal attenuation.

In the examples of rows 4 and 5, a skip-N filter is used as device 207, which results in lower insertion losses for $S_1$ and $S_2$, e.g., 1.7 dB instead of 3 dB for both $S_1$ and $S_2$. Row 5 uses smart channel allocation as well.

According to an example embodiment, a dual split WDM-PON architecture may be provided that may allow a higher usage of optical seed signals and data signals, CO AWGs, and feeder fiber, by combining two PONs into a dual split PON using an optical splitting device and two distribution fibers. Asymmetrical power splitting and/or smart channel allocation may be used to offset or accommodate for the insertion loss introduced by the optical splitting device and/or different lengths (different losses) of the two distribution fibers, while meeting an overall power budget. According to an example embodiment, an apparatus may include an optical splitting device (e.g., 207) configured to receive multiplexed optical seeds and data signals, including a plurality of multiplexed individual optical seeds and a plurality of multiplexed individual optical data signals, via a feeder fiber (e.g., 206), and to output the multiplexed optical seeds and data signals onto each of a first distribution fiber (e.g., 211) and a second distribution fiber (e.g., 213); a first cyclic arrayed waveguide grating (AWG) (e.g., 204A) provided at a first node and coupled to the first distribution fiber, the first cyclic AWG configured to demultiplex the multiplexed optical seeds and optical data signals and to distribute, for one or more of the plurality of individual optical seeds and data signals, one of the individual optical seeds and one of the individual optical data signals to a respective optical network unit (ONU) coupled to the first cyclic AWG; a second cyclic AWG (e.g., 204B) provided at a second node and coupled to the second distribution fiber, the second cyclic AWG configured to demultiplex the multiplexed optical seeds and data signals and to distribute, for one or more of the plurality of individual optical seeds and data signals, one of the individual optical seeds and one of the individual optical data signals to a respective optical network unit (ONU) coupled to the second cyclic AWG In an example embodiment, the first and the second cyclic AWGs (e.g., 204A, 204B) are configured to allocate or distribute each of the plurality of individual optical seeds and data signals to a respective ONU that is coupled to either the first cyclic AWG or coupled to the second cyclic AWG.

In the apparatus, one or more of the individual optical seeds and optical data signals may be allocated to either the first cyclic AWG or the second cyclic AWG based on at least a performance of each of the individual optical data signals, wherein each pair of an individual optical seed and an individual optical data signal having a same or corresponding channel and on a different frequency band are allocated as a pair based on a performance of the individual optical data signal.

In an example embodiment of the apparatus, one or more of the individual optical seeds and optical data signals are allocated to either the first cyclic AWG or the second cyclic AWG based on a power loss of the first distribution fiber, a power loss of the second distribution fiber, and a performance of each of the individual optical data signals.

In an example embodiment of the apparatus, one or more of the individual optical seeds and individual data signals are allocated to either the first cyclic AWG or the second cyclic AWG based on a power loss of paths associated with each of the first and second cyclic AWGs.

In an example embodiment of the apparatus, the first cyclic AWG is configured to distribute a first subset of the individual optical seeds and optical data signals to respective ONUs coupled to the first cyclic AWG, and wherein the second cyclic AWG is configured to distribute a second subset of the individual optical seeds and optical data signals to respective ONUs coupled to the second cyclic AWG, wherein the first subset and the second subset are non-overlapping.

In an example embodiment of the apparatus, at least a first ONU is coupled to the first cyclic AWG and a second ONU is coupled to the second cyclic AWG; the first cyclic AWG is configured to distribute a first individual optical seed to the first ONU, and later to discontinue distributing the first individual optical seed to the first ONU; the second cyclic AWG is configured to distribute the first individual optical seed to the second ONU after the first AWG has discontinued distributing the first individual optical seed to the first ONU.

In an example embodiment of the apparatus, a first group of one or more of the individual optical data signals have a performance that is higher than a performance of a second group of one or more of the individual optical data signals, and wherein a power loss of the first distribution fiber is greater than a power loss of the second distribution fiber; wherein the first cyclic AWG is configured to distribute the first group of individual optical seeds and data signals to respective ONUs coupled to the first cyclic AWG; and wherein the second cyclic AWG is configured to distribute the second group of individual optical seeds and data signals to respective ONUs coupled to the second cyclic AWG.

In an example embodiment of the apparatus, the first group of one or more of the individual optical data signals are located nearer a center of a bandwidth as compared to the second group of one or more of the individual optical data signals, and the second group of one or more of the individual optical data signals are located closer to an edge of the bandwidth as compared to the first group of the individual optical data signals.

In an example embodiment of the apparatus, a power loss of the first distribution fiber is greater than a power loss of the second distribution fiber; and wherein the optical splitting device provides an asymmetrical power splitting ratio to provide more power for optical seed and data signals on the first distribution fiber and less power for the optical seeds and signals on the second distribution fiber.

In an example embodiment of the apparatus, the optical splitting device (e.g., 207) may include a passive optical power splitter/coupler.

The apparatus of claim 1 wherein the optical splitting device includes a filter that uses a skip configuration, where one or more of the individual optical seeds and signals are skipped or omitted.

In an example embodiment of the apparatus, the polarization independent optical transmitter comprises at least one of: a polarization independent reflective semiconductor optical amplifier or a polarization independent Fabry Perot laser interferometer.

According to another example embodiment, an apparatus may include an optical splitting device (e.g., 207) configured to receive multiplexed optical data signals, including a plurality of multiplexed individual optical data signals, via a feeder fiber (e.g., 206), and to output the multiplexed optical data signals onto each of a first distribution fiber (e.g., 211) and a second distribution fiber (e.g., 213); wherein one or more of the plurality of individual optical data signals are each allocated to either an optical network unit (ONU) coupled to the first distribution fiber or an ONU coupled to the second distribution fiber based on a performance of the individual optical data signal and a power loss of the first distribution fiber and a power loss of the second distribution fiber.

The apparatus may further include a first cyclic arrayed waveguide grating (AWG) (e.g., 204A) provided at a first node and coupled to the first distribution fiber, the first cyclic AWG configured to demultiplex the multiplexed optical data signals and to distribute, for one or more of the plurality of individual optical data signals, one of the individual optical data signals to a respective optical network unit (ONU) coupled to the first cyclic AWG; and, a second cyclic AWG (e.g., 204B) provided at a second node and coupled to the second distribution fiber, the second cyclic AWG configured to demultiplex the multiplexed optical data signals and to distribute, for one or more of the plurality of individual optical data signals, one of the individual optical data signals to a respective optical network unit (ONU) coupled to the second cyclic AWG.

In an example embodiment of the apparatus, the first and the second cyclic AWGs are configured to allocate or distribute each of the plurality of individual optical data signals to a respective ONU that is coupled to either the first cyclic AWG or coupled to the second cyclic AWG.

In an example embodiment of the apparatus, a first group of one or more of the individual optical data signals have a performance that is higher than a performance of a second group of one or more of the individual optical data signals, and wherein a power loss of the first distribution fiber is greater than a power loss of the second distribution fiber; wherein the first cyclic AWG is configured to distribute the first group of individual optical data signals to respective ONUs coupled to the first cyclic AWG; and wherein the second cyclic AWG is configured to distribute the second group of individual optical data signals to respective ONUs coupled to the second cyclic AWG.

In an example embodiment of the apparatus, the optical splitting device may include one of: a passive optical power splitter, or a filter that uses a skip configuration.

In an example embodiment of the apparatus, the optical splitting device may be configured to receive multiplexed optical seeds and optical data signals, including a plurality of multiplexed individual optical seeds and a plurality of multiplexed individual optical data signals, via a feeder fiber, and to output the multiplexed optical seeds and optical data signals onto each of a first distribution fiber and a second distribution fiber, the optical seeds being in a different frequency band than the optical data signals.

According to another example embodiment, an apparatus may include an optical splitting device (e.g., 207) configured to receive multiplexed optical seeds and optical data signals, including a plurality of multiplexed individual optical seeds and a plurality of multiplexed individual optical data signals, via a feeder fiber (e.g., 206), and to output the multiplexed optical seeds and optical data signals onto each of a first distribution fiber (e.g., 211) and a second distribution fiber (e.g., 213); wherein a power loss of the first distribution fiber is greater than a power loss of the second distribution fiber; and wherein the optical splitting device provides an asymmetrical power splitting ratio to provide more power to the optical seeds and optical data signals output onto the first distribution fiber and less power to the optical seeds and optical data signals output onto the second distribution fiber.

The apparatus may further include a first cyclic arrayed waveguide grating (AWG) (e.g., 204A) provided at a first node and coupled to the first distribution fiber, the first cyclic AWG configured to demultiplex the multiplexed optical seeds and optical data signals and to distribute, for one or more of the plurality of individual optical seeds and optical data signals, one of the individual optical seeds and one of the individual optical data signals to a respective optical network unit (ONU) coupled to the first cyclic AWG; and a second cyclic AWG (e.g., 204B) provided at a second node and coupled to the second distribution fiber, the second cyclic AWG configured to demultiplex the multiplexed optical seeds and optical data signals and to distribute, for one or more of the plurality of individual optical seeds and optical data signals, one of the individual optical seeds and one of the individual optical data signals to a respective optical network unit (ONU) coupled to the second cyclic AWG.

Figure 4:
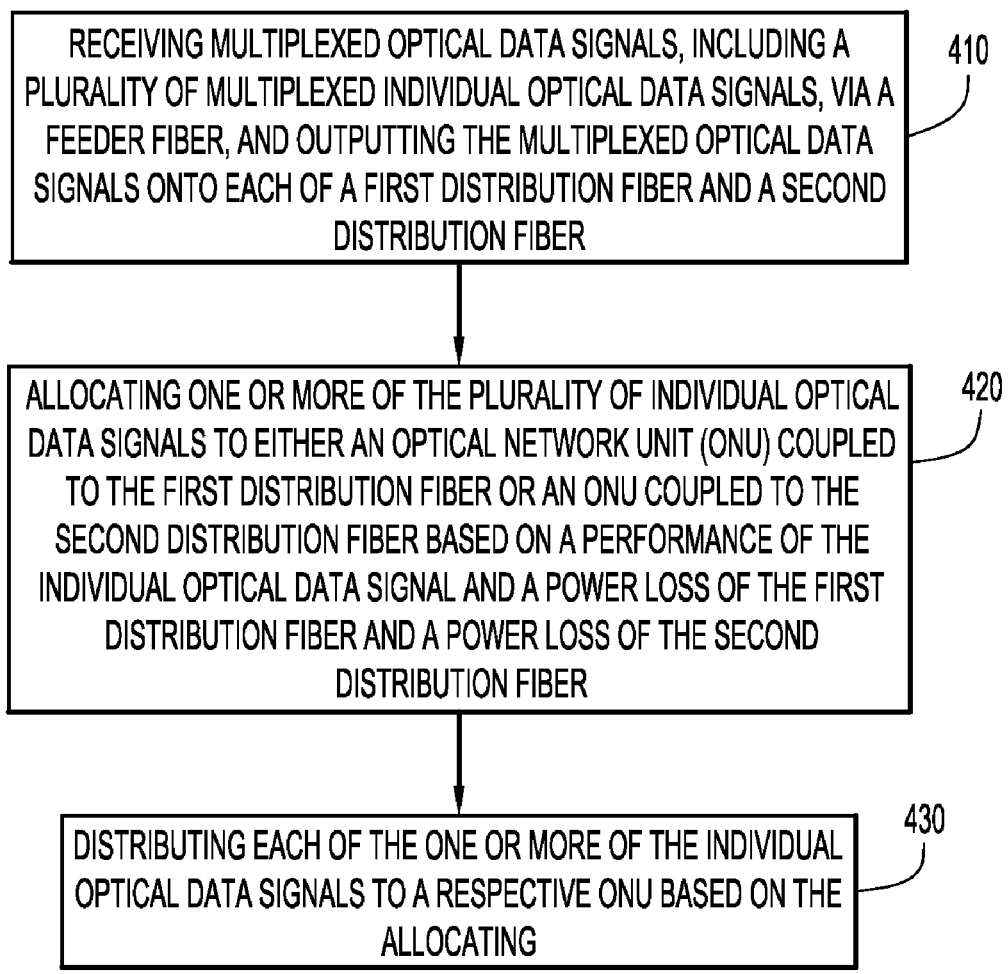
FIG. 4 is a flow chart illustrating operation of a WDM PON according to an example embodiment.

FIG. 4 is a flow chart illustrating operation of a WDM PON according to an example embodiment. Operation 410 may include receiving multiplexed optical data signals, including a plurality of multiplexed individual optical data signals, via a feeder fiber, and outputting the multiplexed optical data signals onto each of a first distribution fiber and a second distribution fiber. Operation 410 may be performed by optical splitting device 207, for example.

Operation 420 may include allocating one or more of the plurality of individual optical data signals to either an optical network unit (ONU) coupled to the first distribution fiber or an ONU coupled to the second distribution fiber based on a performance of the individual optical data signal and a power loss of the first distribution fiber and a power loss of the second distribution fiber. For example, cyclic AWGs 204A, 204B may each allocate individual optical seeds and data signals (of specific channels) to be output to specific ONUs. For example, cyclic AWG 204A may be configured to output channels (optical data signal channels) 1, 3, and 5 to ONUs 1, 2 and 3, while AWG204B may be configured to output channels 2, 4 and 6 to ONUs 14, 15 and 16. This is merely an example of how specific optical channels or signals may be allocated to specific ONUs, which are coupled to either distribution fibers 211 or 213. For example, the allocation (or channel/ONU assignment) may be performed based on channel performance and/or path loss or power loss of the distribution fibers.

Operation 430 may include distributing each of the one or more of the individual optical data signals to a respective ONU based on the allocating. For example, AWG 204A and AWG 204B may output the optical channels/signals to specific ONUs based on the channel/ONU allocation or assignment.

According to another example embodiment, an apparatus may include means (e.g., optical splitting device 207) for receiving multiplexed optical data signals, including a plurality of multiplexed individual optical data signals, via a feeder fiber, and for outputting the multiplexed optical data signals onto each of a first distribution fiber and a second distribution fiber; means for allocating (e.g., cyclic AWG 204A, and/or 204B) one or more of the plurality of individual optical data signals to either an optical network unit (ONU) coupled to the first distribution fiber or an ONU coupled to the second distribution fiber based on a performance of the individual optical data signal and a power loss of the first distribution fiber and a power loss of the second distribution fiber; and means (e.g., cyclic AWG 204A and/or 204B) for distributing each of the one or more of the individual optical data signals to a respective ONU based on the allocating.

While certain features of the described implementations have been illustrated as described herein, many modifications, substitutions, changes and equivalents will now occur to those skilled in the art.

What is claimed is:

1. An apparatus comprising:
   an optical splitting device configured to receive multiplexed optical seeds and data signals, including a plurality of multiplexed individual optical seeds and a plurality of multiplexed individual optical data signals, via a feeder fiber, and to output at least a first and a second group of the multiplexed optical seeds and data signals onto each of a first distribution fiber and a second distribution fiber, respectively;
   a first cyclic arrayed waveguide grating (AWG) provided at a first node and coupled to the first distribution fiber, the first cyclic AWG configured to demultiplex the first group of multiplexed optical seeds and optical data signals and to distribute, for one or more of the plurality of individual optical seeds and data signals in the first group, one of the individual optical seeds and one of the individual optical data signals to a respective optical network unit (ONU) coupled to the first cyclic AWG; and
   a second cyclic AWG provided at a second node and coupled to the second distribution fiber, the second cyclic AWG configured to demultiplex the second group of multiplexed optical seeds and data signals and to distribute, for one or more of the plurality of individual optical seeds and data signals in the second group, one of the individual optical seeds and one of the individual optical data signals to a respective optical network unit (ONU) coupled to the second cyclic AWG;
   wherein the first and the second cyclic AWGs are configured to allocate or distribute each of the plurality of individual optical seeds and data signals to a respective ONU that is coupled to either the first cyclic AWG or coupled to the second cyclic AWG.

2. The apparatus of claim 1 wherein one or more of the individual optical seeds and optical data signals are allocated to either the first cyclic AWG or the second cyclic AWG based on at least a performance of each of the individual optical data signals.

3. The apparatus of claim 1 wherein one or more of the individual optical seeds and optical data signals are allocated to either the first cyclic AWG or the second cyclic AWG based on a power loss of the first distribution fiber, a power loss of the second distribution fiber, and a performance of each of the individual optical data signals.

4. The apparatus of claim 1 wherein one or more of the individual optical seeds and individual data signals are allocated to either the first cyclic AWG or the second cyclic AWG based on a power loss of paths associated with each of the first and second cyclic AWGs.

5. The apparatus of claim 1 wherein the first cyclic AWG is configured to distribute a first subset of the individual optical seeds and optical data signals to respective ONUs coupled to the first cyclic AWG, and wherein the second cyclic AWG is configured to distribute a second subset of the individual optical seeds and optical data signals to respective ONUs coupled to the second cyclic AWG, wherein the first subset and the second subset are non-overlapping.

6. The apparatus of claim 1 wherein at least a first ONU is coupled to the first cyclic AWG and a second ONU is coupled to the second cyclic AWG;
   the first cyclic AWG is configured to distribute a first individual optical seed to the first ONU, and later to discontinue distributing the first individual optical seed to the first ONU;
   the second cyclic AWG is configured to distribute the first individual optical seed to the second ONU after the first AWG has discontinued distributing the first individual optical seed to the first ONU.

7. The apparatus of claim 1 wherein a first one or more of the individual optical data signals have a performance that is higher than a performance of a second one or more of the individual optical data signals, and wherein a power loss of the first distribution fiber is greater than a power loss of the second distribution fiber;
   wherein the first cyclic AWG is configured to distribute the first one or more of the individual optical seeds and data signals to respective ONUs coupled to the first cyclic AWG; and
   wherein the second cyclic AWG is configured to distribute the second group of one or more of the individual optical seeds and data signals to respective ONUs coupled to the second cyclic AWG.

8. The apparatus of claim 7 wherein the first one or more of the individual optical data signals are located nearer a center of a bandwidth as compared to the second one or more of the individual optical data signals, and the second one or more of the individual optical data signals are located closer to an edge of the bandwidth as compared to the first one or more of the individual optical data signals.

9. The apparatus of claim 1 wherein a power loss of the first distribution fiber is greater than a power loss of the second distribution fiber; and
   wherein the optical splitting device provides an asymmetrical power splitting ratio to provide more power for optical seed and data signals on the first distribution fiber and less power for the optical seeds and signals on the second distribution fiber.

10. The apparatus of claim 1 wherein the optical splitting device comprises a passive optical power splitter/coupler.

11. The apparatus of claim 1 wherein the optical splitting device comprises a filter that uses a skip configuration, where one or more of the individual optical seeds and signals are skipped or omitted.

12. The apparatus of claim 1 further comprising at least one of:
   a polarization independent reflective semiconductor optical amplifier or a polarization independent Fabry Perot laser interferometer.

13. An apparatus comprising:
   an optical splitting device configured to receive via a feeder fiber multiplexed optical seeds and optical data signals, including a plurality of multiplexed individual optical seeds and a plurality of multiplexed individual optical data signals, and to output at least a first and a second group of the multiplexed optical seeds and optical data signals onto each of a first distribution fiber and a second distribution fiber, respectively, wherein the optical seeds are in a different frequency band than the optical data signals;

wherein one or more of the plurality of individual optical data signals are each allocated to either an optical network unit (ONU) coupled to the first distribution fiber or an ONU coupled to the second distribution fiber based on a performance of the one or more of the plurality individual optical data signals and a power loss of the first distribution fiber and a power loss of the second distribution fiber.

14. The apparatus of claim 13 and further comprising:
a first cyclic arrayed waveguide grating (AWG) provided at a first node and coupled to the first distribution fiber, the first cyclic AWG configured to demultiplex the first group of multiplexed optical data signals and to distribute, for one or more of the plurality of individual optical data signals in the first group, one of the individual optical data signals to a respective optical network unit (ONU) coupled to the first cyclic AWG;
a second cyclic AWG provided at a second node and coupled to the second distribution fiber, the second cyclic AWG configured to demultiplex the second group of multiplexed optical data signals and to distribute, for one or more of the plurality of individual optical data signals in the second group, one of the individual optical data signals to a respective optical network unit (ONU) coupled to the second cyclic AWG.

15. The apparatus of claim 14 wherein the first and the second cyclic AWGs are configured to allocate or distribute each of the plurality of individual optical data signals to a respective ONU that is coupled to either the first cyclic AWG or coupled to the second cyclic AWG.

16. The apparatus of claim 14 wherein a first one or more of the individual optical data signals have a performance that is higher than a performance of a second one or more of the individual optical data signals, and wherein a power loss of the first distribution fiber is greater than a power loss of the second distribution fiber;
wherein the first cyclic AWG is configured to distribute the first one or more of the individual optical data signals to respective ONUs coupled to the first cyclic AWG; and
wherein the second cyclic AWG is configured to distribute the second one or more of the individual optical data signals to respective ONUs coupled to the second cyclic AWG.

17. The apparatus of claim 13 wherein the optical splitting device comprises one of:
a passive optical power splitter, or a filter that uses a skip configuration.

18. An apparatus comprising:
an optical splitting device configured to receive multiplexed optical seeds and optical data signals, including a plurality of multiplexed individual optical seeds and a plurality of multiplexed individual optical data signals, via a feeder fiber, and to output the multiplexed optical seeds and optical data signals onto each of a first distribution fiber and a second distribution fiber;
wherein a power loss of the first distribution fiber is greater than a power loss of the second distribution fiber; and
wherein the optical splitting device provides an asymmetrical power splitting ratio to provide more power to the optical seeds and optical data signals output onto the first distribution fiber and less power to the optical seeds and optical data signals output onto the second distribution fiber.

19. The apparatus of claim 18 and further comprising:
a first cyclic arrayed waveguide grating (AWG) provided at a first node and coupled to the first distribution fiber, the first cyclic AWG configured to demultiplex the multiplexed optical seeds and optical data signals and to distribute, for one or more of the plurality of individual optical seeds and optical data signals, one of the individual optical seeds and one of the individual optical data signals to a respective optical network unit (ONU) coupled to the first cyclic AWG; and
a second cyclic AWG provided at a second node and coupled to the second distribution fiber, the second cyclic AWG configured to demultiplex the multiplexed optical seeds and optical data signals and to distribute, for one or more of the plurality of individual optical seeds and optical data signals, one of the individual optical seeds and one of the individual optical data signals to a respective optical network unit (ONU) coupled to the second cyclic AWG.

20. A method comprising:
receiving, at an optical splitting device via a feeder fiber, multiplexed optical seeds and optical data signals, including a plurality of multiplexed individual optical seeds and a plurality of multiplexed individual optical data signals;
outputting one or more of the multiplexed optical seeds and optical data signals onto each of a first distribution fiber and a second distribution fiber, wherein the optical seeds are in a different frequency band than the optical data signals;
allocating one or more of the plurality of individual optical data signals to either an optical network unit (ONU) coupled to the first distribution fiber or an ONU coupled to the second distribution fiber based on a performance of the one or more of the plurality individual optical data signals and a power loss of the first distribution fiber and a power loss of the second distribution fiber; and
distributing each of the one or more of the individual optical data signals to a respective ONU based on the allocating.

21. An apparatus comprising:
means for receiving, at an optical splitting device via a feeder fiber, multiplexed optical seeds and optical data signals, including a plurality of multiplexed individual optical seeds and a plurality of multiplexed individual optical data signals;
means for outputting one or more of the multiplexed optical seeds and optical data signals onto each of a first distribution fiber and a second distribution fiber, wherein the optical seeds are in a different frequency band than the optical data signals;
means for allocating one or more of the plurality of individual optical data signals to either an optical network unit (ONU) coupled to the first distribution fiber or an ONU coupled to the second distribution fiber based on a performance of the one or more of the plurality individual optical data signals and a power loss of the first distribution fiber and a power loss of the second distribution fiber; and
means for distributing each of the one or more of the individual optical data signals to a respective ONU based on the allocating.

* * * * *